Nov. 8, 1960
L. J. CLARK ET AL
2,959,318
CONTAINERS FOR LIQUEFIED GASES
Filed June 18, 1959
2 Sheets-Sheet 1
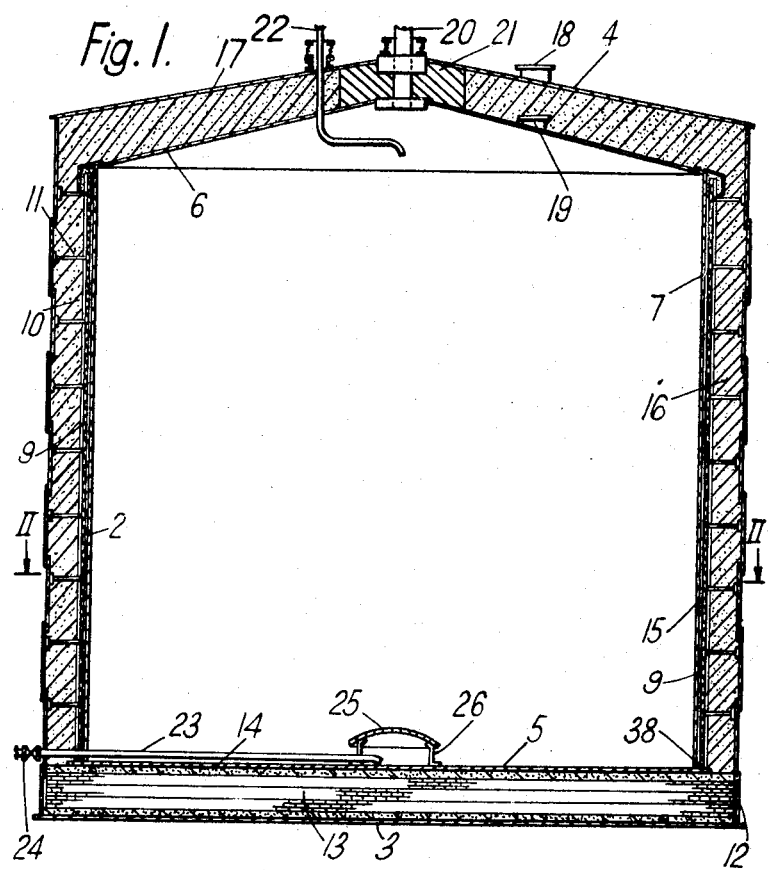
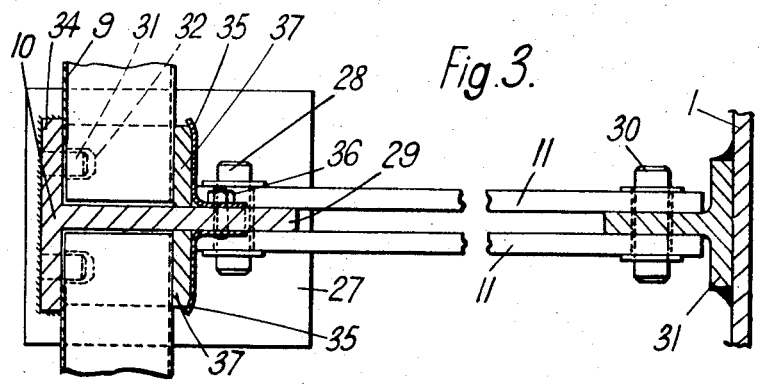
Inventors
L. J. Clark
H. F. Goodman
By
Holcomb, Vethnell & Buckner
Attorneys Nov. 8, 1960     L. J. CLARK ET AL     2,959,318
CONTAINERS FOR LIQUEFIED GASES
Filed June 18, 1959     2 Sheets-Sheet 2
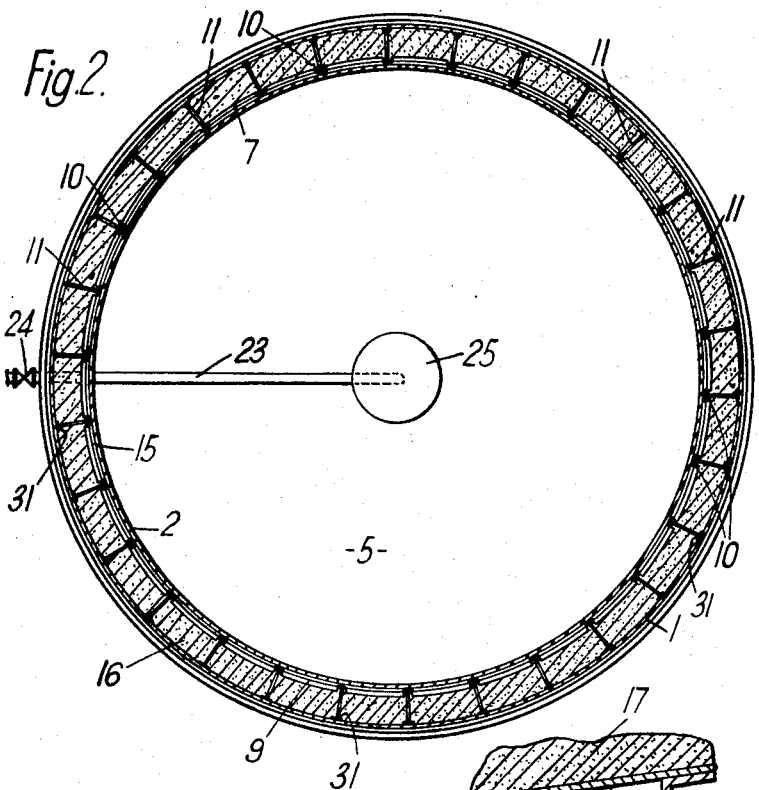
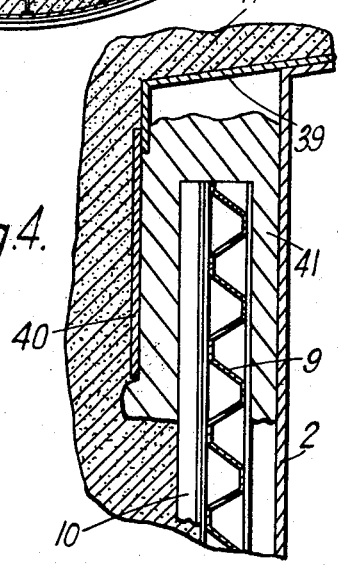
Inventor
L. J. Clark
H. F. Goodman
By
Attorneys

# United States Patent Office 2,959,318
Patented Nov. 8, 1960

2,959,318

CONTAINERS FOR LIQUEFIED GASES

Leslie Joseph Clark, London, and Hugh Frederick Goodman, Crawley, England, assignors to North Thames Gas Board, London, England, a British body corporate Filed June 18, 1959, Ser. No. 821,206

Claims priority, application Great Britain July 1, 1958

8 Claims. (Cl. 220—15)

This invention relates to containers for storing liquefied gases, the temperature of which is substantially lower than atmospheric temperature.

One form of container for this purpose comprises an inner shell which is surrounded by an outer shell with a space between them. This space contains a free-flowing powdered insulating material. When such a container is empty, the two shells will initially be at substantially the same temperature. As the container is filled, however, the temperature of the inner shell is lowered by the liquefied gas and this shell consequently contracts. The contraction of the inner shell causes the size of the space between the two shells to be increased and the powdered insulating material runs down to fill the voids which are caused by the increase in size of the space. When the temperature of the inner shell rises again, for example when the container has been emptied, the size of the space between the two shells decreases again as the inner shell expands.

The expansion of the inner shell causes an outward pressure to be exerted on the powder. The powder is, therefore, compacted. Repetition of the cycle of a decrease and a subsequent increase of the temperature of the inner shell leads to a build-up of the outward pressure on the powder. This pressure is transmitted through the powder to the outer shell. Since the container is constructed to withstand an internal pressure, the outer shell can easily withstand the outward pressure exerted on it by the powder but the pressure of the powder produces an inward reaction on the inner shell. This inward reaction on the inner shell is very disadvantageous because the inner shell must be stiffened to withstand it, whereas otherwise it need only be constructed to withstand the internal pressure of the liquefied gas.

The object of the present invention is to prevent the pressure which builds up in the powdered insulating material from being transmitted inwards on to the inner shell of such a container.

According to the present invention, a heat-insulated container for storing liquefied gas, the temperature of which is lower than atmopheric temperature, comprises an inner shell, an intermediate wall surrounding the inner shell with a space between the inner shell and the wall and an outer shell surrounding the wall with a further space, which contains powdered heat-insulating material, between the wall and the outer shell, the wall comprising a supporting framework fixed at intervals by ties to the outer shell and a series of panels carried by the framework, the panels being free to expand and contract relatively to the framework and to each other in a direction around the periphery of the wall upon changes of temperature taking place, and thus maintaining the width of the space, occupied by the powdered heat-insulating material, between the wall and the outer shell substantially constant.

Because the width of the space between the intermediate wall and the outer shell remains substantially constant when the temperature of the inner shell fluctuates, the tendency for pressures to build up in the powdered insulating material is very greatly reduced. The intermediate wall may, however, be made sufficiently flexible to enable it to deflect without damage under the action of any pressures which may build up in the powdered insulating material.

Plywood panels carried on timber supports may be used to form the intermediate wall but, preferably, corrugated aluminium sheets having the crests and troughs of their corrugations running peripherally around the wall are used. The aluminium sheets may be supported on a framework which consists of vertical bars of T-shaped cross-section which are connected at intervals by tie-rods to the outer shell. To reduce the amount of heat transmitted to the inner shell, the tie-rods may be made of heat insulating material.

The edges of the corrugated sheets which run peripherally around the wall are lapped over each other for a length of one corrugation and these joints are sealed with flexible jointing material to prevent the powdered insulating material from penetrating into the space between the inner shell and the intermediate wall. The joints between the corrugated aluminium sheets and the vertical T-shaped members on which they are carried are also sealed in a similar manner. The flexible jointing material should remain flexible and also resilient at the low temperatures involved.

An example of a container constructed in accordance with the invention is illustrated in the accompanying drawings, in which:

Figure 1 is a vertical cross-section on the centre-line of the container;

Figure 2 is a sectional plan as seen in the direction of the arrows on the line II—II in Figure 1;

Figure 3 is a detail to a larger scale showing a part of the supporting framework and one of the heat-insulating members by which this framework is connected to the outer shell; and Figure 4 is a further detail to a larger scale showing a seal between the top of the intermediate wall and the inner shell.

The container, which is cylindrical and is approximately 50 feet in diameter and 50 feet in height, has an outer shell 1 and an inner shell 2. The outer shell is built up from steel plates which may have riveted or welded joints. The outer shell has a base plate 3 which rests on the ground and has a conical cover 4 which is supported on radial beams, which are not shown. The inner shell 2 is made of aluminium alloy which retains its strength at low temperatures of the order of that of liquefied methane at atmospheric pressure which is about minus 160° C. The inner shell 2 is stiffened with aluminium angle sections, which are not shown. It has a base plate 5 and a conical roof 6.

An intermediate wall 7 completely surrounds the inner shell 2 in the space between the inner and outer shells. The intermediate wall 7 consists of corrugated aluminium sheets 9 supported on a framework consisting of vertical stanchions 10 of T-shaped cross-section which are fixed at intervals by tie-rods 11 to the outer shell 1. The base plate 5 of the inner shell 2 is supported on an insulating layer 12 which consists of a number of courses of diatomaceous bricks 13 covered by a layer of lightweight concrete 14.

There is an annular air space 15, which, at atmospheric temperature, is approximately 2 inches in width, between the innermost part of the inner surface of the corrugated sheets 9 and the outer surface of the inner shell 2. The annular space 16 between the outer surface of the intermediate wall 7 and the inner surface of the outer shell 1, which is approximately 2 feet 10 inches in width, is filled with powdered Perlite insulating material. A space 17 between the conical cover 4 and the conical roof 6 is also filled with this powdered Perlite.

For access purposes, the outer shell 1 has a manhole 18 and the inner shell has a manhole 19. A liquefied gas inlet pipe 20 which has a shut off valve, which is not shown, passes through the cover 4 and the roof 6. The pipe 20 is surrounded in the space 17 by a seal 21 made of insulating material which remains resilient at low temperatures of the order of that of liquefied methane. Material known by the trade name "Fibroceta" which is a fibrous mat of cellulose acetate is used in this example. Adjacent the liquefied gas inlet pipe 20 is a gas take-off pipe 22 from which any gas which boils off due to increase of temperature is drawn off. At the bottom of the inner shell is a liquefied gas draw-off pipe 23 which has a shut-off valve 24. The inner end of the draw-off pipe 23 is covered by a splash plate 25 supported from the bottom 5 of the inner shell on legs 26.

Further details of the construction of the intermediate wall 7 are shown in Figures 3 and 4.

Figure 3 is a horizontal section through a part of the container showing one of the vertical stanchions 10. This stanchion is welded to a footplate 27 which rests on the edge of the base plate 5. The tie-rods 11 are made of material known by the trade name of Tufnol which is a heat-insulating reinforced plastic material. A pair of tie-rods are fixed at one of their ends by a pin 28 to the web 29 of the T-shaped stanchion and at their other ends by a further pin 30 to a T-shaped bracket 31 welded to the outer shell 1.

The corrugated sheets 9 have slots 32 at their ends which fit over pins 33 fixed to the flanges 34 of the T-shaped stanchions 10. Adjacent horizontal edges of the sheets 9 overlap each other by one corrugation and these joints are sealed by a thin layer of "Fibroceta" interposed between the two sheets. The sheets 9 are held in position against the faces of the flanges 34 of the T-shaped stanchions 10 by angle strips 35 fixed by bolts 36 to the webs 29. Sealing strips 37 are interposed between the sheets 9 and the strips 35. The sealing strips 37 are shaped on one face so that they fit closely with the corrugated sheets and their other faces 35 are straight.

The strips 37 are faced with resilient "Fibroceta" material so that the sheets 9 are firmly held in position but are free to move horizontally, that is to say, peripherally around the inner shell 2 between the vertical stanchions 10. The extent of this peripheral movement is limited by the clearance of the pins 31 in the slots 32.

A further layer of "Fibroceta" is interposed to act as a seal between the bottom edges 38 of the lowermost sheets 9 and the base plate 5. The space between the inner shell and the top edges of the uppermost sheets 9 are also sealed, as shown in detail in Figure 4. This seal allows horizontal movement of the sheets 9 to take place but prevents the powdered Perlite material in the spaces 16 and 17 from penetrating into the space 15 between the intermediate wall 7 and the inner shell 2.

To form the seal, the roof 6 of the shell 2 is provided with a projection 39 which carries a skirt 40. The top ends of the stanchions 10 and the top edges of the sheets 9 project upwards within the space between the skirt 40 and the top of the shell 2 and a wad 41 of "Fibroceta" is inserted into the space between the skirt 40 and the top of the shell 2 into close contact with both the stanchions 10 and the sheets 9.

In use, when the inner shell 2 is filled with liquefied gas through the inlet pipe 20, this shell contracts, thus causing the width of the annular space 15 to increase. The temperature of the sheets 9 is also lowered considerably, although it does not go as low as that of the shell 2 because of the existence of the annular space 15. Since the stanchions 10 are fixed by the rods 11 to the outer shell 1, the overall diameter of the intermediate wall 7 is not, however, decreased, due to the contraction of the sheets 9. Each of the sheets 9 contracts separately in a longitudinal direction so that the ends of the sheets move away from the webs 29 of the stanchions 10.

The extent of this longitudinal movement of the sheets 9 is limited by the clearance of the pins 31 in the slots 32. This must be made, of course, sufficient to take up all the contraction of the sheets 9 which may take place when the container is filled with any particular liquefied gas.

Since the diameter of the intermediate wall 7 does not alter, the powdered Perlite filling in the space 16 is not disturbed and in consequence there is no tendency for the pressure in it to build up.

We claim:

1. A heat-insulating container for storing liquefied gas, the temperature of which is substantially lower than atmospheric temperature, said container comprising an inner shell, an intermediate wall surrounding said inner shell and defining a space between itself and said inner shell, an outer shell surrounding said intermediate wall and defining a second space between itself and said intermediate wall, and powdered heat-insulating material in said second space, said intermediate wall comprising a supporting framework, ties fixing said supporting framework at intervals to said outer shell, and a series of panels carried by said framework, said panels being free to expand and contract relatively to said framework and to each other in a direction around the periphery of said intermediate wall upon changes of temperature taking place, whereby the width of said second space is maintained substantially constant.

2. A container according to claim 1, in which the panels are made of corrugated sheeting, the crests and troughs of the corrugations of which run peripherally around the wall.

3. A container according to claim 1, in which the supporting framework comprises a series of vertically disposed T-shaped members spaced apart from each other around the inner shell, each T-shaped member being attached at intervals along its length to the outer shell by the ties.

4. A container according to claim 1, in which the inner shell, the intermediate wall and the outer shell are cylindrical.

5. A container according to claim 1, in which the powdered material is Perlite.

6. A container according to claim 1, in which the ties are made of heat insulating material.

7. A container according to claim 1, in which the joints between adjacent panels are sealed by the interposition between the panels of jointing material which is flexible and resilient at a temperature of minus 160° C.

8. A container according to claim 7, in which the joints between the panels and the supporting framework are sealed with jointing material which is flexible and resilient at a temperature of minus 160° C.

References Cited in the file of this patent

UNITED STATES PATENTS

| | | |
|---|---|---|
| 1,675,354 | Kemper | July 3, 1928 |
| 2,684,171 | Ernst | July 20, 1954 |

FOREIGN PATENTS

| | | |
|---|---|---|
| 492,103 | Canada | Apr. 14, 1953 |
| 541,447 | Belgium | Oct. 15, 1955 |